Sept. 13, 1949.  W. C. ERWIN  2,481,831
OUTSIDE CUTTER
Filed April 24, 1948
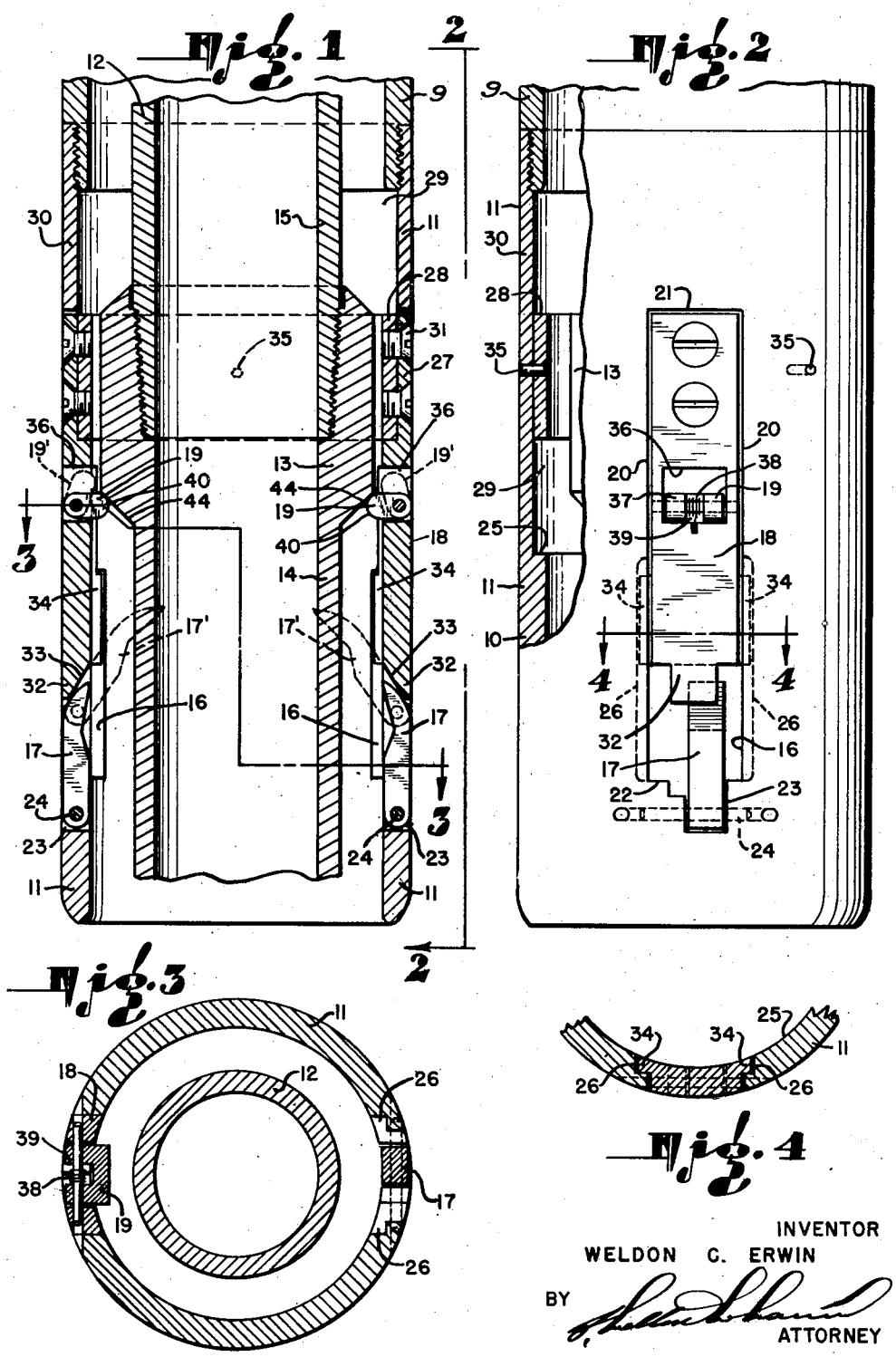
INVENTOR
WELDON C. ERWIN
BY
ATTORNEY Patented Sept. 13, 1949

2,481,831

UNITED STATES PATENT OFFICE 2,481,831

OUTSIDE CUTTER

Weldon C. Erwin, South Gate, Calif.

Application April 24, 1948, Serial No. 23,100

8 Claims. (Cl. 164—0.7)

This invention relates to a device for cutting off drill pipe, tubing or casing in wells, and relates in particular to an outside pipe cutter of simple form which is operable in spaces of reduced dimension, wherein cutting devices of form now commonly employed cannot be operated.

Quite often the pipe to be cut off in a well by means of an outside cutter is so large in relation to the well bore or casing in which the pipe is lodged that the usual or ordinary types of outside cutters cannot be used, because the wall thickness of these cutters is greater than the annular space around the pipe to be cut in which the cutter must be moved and operated. It is an object of the invention to provide an outside cutter for pipe or tubing in wells having operative parts carried by a hollow cylindric body which is of reduced thickness, thereby providing a tool having a maximum inside diameter and a minimum outside diameter, so that the tool may be operated in an annular space of such size that it will not receive ordinary cut-off tools.

It is an object of the invention to provide a pipe cutting device of this character, having its cooperating parts so correlated and combined that the results set forth in the foregoing may be achieved.

A further object of the invention is to provide a simple outside cutting device for pipe or tubing in a well which does not utilize springs for or in conjunction with the forcing of the cutter blades inwardly into engagement with the pipe to be cut, but utilizes force derived from an upward pull on the pipe string which supports the cutting device for feeding of the cutters radially inwardly during the cutting operation.

It is an object of the invention to provide an outside cutting device of this character, wherein all of the operating parts, with the exception of yieldably disposed pipe engaging dogs, are contained in windows, apertures and recesses formed in a thin walled cylinder, thereby making it possible to slide the device into any annular space around a pipe to be cut which is of a size to receive the thin walled cylinder.

A further object of the invention is to provide in this outside pipe cutting device, cutter blades which are swingable inwardly from chambers or windows formed in the cylindric body of the device and simple means for effecting movement of the blades into cutting engagement with the pipe at a selected time.

Further objects and advantages of the invention will be brought out in the following part of the specification, wherein I have in detail described a preferred embodiment of the invention for the purpose of making a complete and clear disclosure of the same without limiting the scope of the invention which is set forth in the appended claims.

Referring to the drawings, which are for illustrative purposes only.

Fig. 1 is a sectional view through a preferred embodiment of the invention and a portion of the pipe therein.

Fig. 2 is a partly sectioned elevational view of Fig. 1, taken from the position indicated by the line 2—2 of Fig. 1.

Fig. 3 is a sectional view taken as indicated by the line 3—3 of Fig. 1.

Fig. 4 is a fragmentary sectional view, taken as indicated by the line 4—4 of Fig. 2.

As shown in the drawings, the device includes a body 10, comprising a relatively thin cylindric wall 11 which is adapted to be connected to the lower end of a string of tubing 9 in any desired manner, so that this cylindric wall 11 may be lowered down around a pipe 12 which is to be cut. Herein the term "pipe" designates a pipe member comprising a plurality of pipe sections joined together in the manners customary to oil well drilling practices. Ordinarily the pipe sections are connected by threaded collars, tool joints and sleeves. As shown in Fig. 1, the internally threaded collar 13 of a pipe section 14 may be integrally formed on the end of the pipe section, the threaded end of a consecutive pipe section 15 being screwed thereinto.

In the cylindric wall 11, a number of chambers 16 are formed, in which cutter blades 17 and cutter actuating members 18 are located. These chambers 16 are open to the interior of the cylindric wall 11 so that the cutter blades 17 may be swung inwardly to the dotted line positions thereof indicated at 17' in Fig. 1, and so that dogs 19 may swing inwardly into the internal space of the cylindric wall 11. However, in the preferred practice of the invention, the chambers 16 are also open to the exterior of the cylindric wall 11 so as to constitute vertically elongated windows in the cylindric wall 11.

These chambers 16, or windows, as they will be now called, are defined by side walls 20, upper end walls 21, and lower stepped end walls 22. The lower end walls 22 have therein notches 23 to receive the lower ends of the cutter blades 17 and tangentially disposed pins 24 are passed through the lower ends of the blades 17 and the adjacent walls of the notches 23, so as to hingedly connect the lower ends of the cutters 17 to the body or cylindric wall 11 of the device. At least the lower portions of the side walls 20 of the windows 16 are undercut or relieved adjacent the inner face 25 of the cylindric wall 11, these undercuts being indicated by the numeral 26 in Figs. 2, 3, and 4 of the drawings.

The cutter actuating members 18 may be conveniently referred to as blocks. They are rectangular in outline, and are arched in accordance with the curvature of the cylindric wall 11. Likewise, the thickness of these blocks 18 corresponds to the thickness of the cylindric wall 11. At their upper ends, the blocks 18 have portions 27 of reduced thickness for connection to an annular member or ring 28 which is vertically slidable in an annular recess 29 in the cylindric wall 11. This recess 29 may be conveniently formed by counterboring the upper portion of the cylindric wall 11, thereby reducing the thickness of the upper portion 30 of the cylindric wall 11 and leaving therein an annular recess in which the ring 28 is vertically slidable. The thickness of the ring 28 is such that it will not project inwardly beyond the inner face 25 of the lower portion of the cylindric wall 11. The upper portions of the cutter feed blocks 18 are connected to the ring 28 as by screws 31, so that the ring 28 will connect the blocks 18 for simultaneous or unitary movement. The lower ends of the blocks 18 are provided with downwardly directed projections 32 having sloping faces 33 to engage the contiguous faces at the upper ends of the blades 17. Also, the blocks 18 have along the lower portions of their side walls enlargements or flanges 34 which rest in the undercuts 26, are vertically slidable in these undercuts 26 and prevent radially outward movement of the lower portions of the blocks 18 relatively to the cylindric wall 11. The upper ends of the blocks 18 are held in the windows 16 by the ring 28. Releasable means are provided for preventing relative downward movement of the blocks 18 in the windows 16, until such downward movement is required for the cutting operation which will be hereinafter described. The releasable restraining or holding means operative between the cylindric wall 11 and the blocks 18 comprise shearable pins 35 which pass through cooperating openings in the ring 28 and the adjacent portion of the cylindric wall 11.

Each cutter feed block 18 has therein an aperture 36 in which a dog 19 is pivotally mounted on a horizontal pin 37. This pin 37 is disposed near the lower wall of the aperture 36, so that the dog may be swung from the inwardly projecting position thereof shown in full lines in Fig. 1 upwardly and outwardly into retracted position in the aperture 36 as shown by dotted lines 19' in Fig. 1. Coil springs are provided for urging the dogs 19 into the inwardly projecting positions thereof. These springs 38 are disposed in notches 39 in the outer end portions of the dogs 19. The inner ends 40 of the dogs 19 are rounded as shown in Fig. 1 for engagement with portions of the pipe 12.

During the time the cutting device is being lowered into the well, the cutter blades 17 occupy positions within the lower portions of the windows 16. At this time there are no elements, with the exception of the dogs 19, projecting outwardly from the outer surface of the cylindric wall 11 or inwardly from the inner surface 25 thereof. Accordingly, the annular space required around the pipe 12 to receive the cutting device need not be materially thicker than the maximum wall thickness of the wall 11. During the lowering of the device around the pipe 12, the springs 38 urge the dogs 19 into the full line positions thereof. Whenever a projection on the pipe 12, such as a tool joint, collar, or sleeve, is met by the inner portions of the inwardly projecting dogs 19 during their downward movement, the dogs merely swing upwardly and outwardly toward the dotted line positions 19' thereof and ride over the obstructions. When the cutting device reaches the position at which the pipe 12 is to be cut off, the device is lifted so that the inwardly projecting portions of the dogs 19 will be lifted into engagement with a downwardly faced shoulder 44, such as provided at the lower end of the collar 13 of the pipe 12. This engagement of the dogs 19 with the shoulder 40 limits the upward movement of the cutter feed blocks 18, so that these cutter feed blocks 18 are held stationary during further upward movement of the cylindric wall 11. The first part of the upward movement of the cylindric wall 11, after engagement of the dogs 19 with the shoulder 44, results in shearing of the pins 35. Thereafter, the blades 17 are lifted against the faces 33 of the blocks 18 which deflect the upper ends of the blades 17 inwardly, as the hinge pins 24, Fig. 1, move upwardly from the full line positions to the dotted line positions thereof in Fig. 1. During this upward movement, the cylindric wall 11 will be rotated in proper direction, thereby causing the points of the blades 17 to travel circularly as they move inwardly, to cut a groove in the pipe 12 and sever the same. During this rotation of the cylindric wall 11, the dogs 19 are carried through a circular path of movement, and slide around the shoulder 44 of the collar 13. To facilitate ease of operation and to eliminate as much as possible damage to the tool or breakage of the knives, I have devised a method of moving the operating string of pipe upwardly, other than by the regular hoist or drawworks usually provided with a rotary drilling rig. This hoisting equipment employs a cable which has one end thereof wound on the spool of the drawworks, the cable then being threaded through the sheaves of the crown and traveling blocks, and the remaining end being then attached to an anchor in one corner of the derrick. To this remaining or dead end of the cable, I connect a chain hoist or an hydraulic ram so as to gradually pull down on the dead end and thereby slowly and smoothly lift the traveling block which is connected to the upper end of the operating string of pipe or tubing which carries at its lower end the cutting device herein disclosed. By this means, the cutting device can be moved upwardly at a controlled rate, without any jerking action, feeding the knives inwardly to cut off the pipe in a smooth and steady manner.

I claim as my invention:

1. In an outside pipe cutting device adapted to be lowered around a pipe having downwardly faced shoulders or collars, the combination of: a cylindric wall having a plurality of chambers open to the interior of the cylindric wall; a cutter blade hinged in the lower part of each of said chambers so as to be swingable inwardly to engage a pipe; a cutter feed block supported in the upper part of each of said chambers so as to be moved up and down with relation to the cutter blade in the chamber, said feed blocks and said blades having cooperating faces whereby downward movement of said blocks will produce inward movement of the cutter blades to cut the pipe; an annular member connecting said blocks together so that they will move in unison; pipe engaging dogs respectively supported by said blocks so as to move from inwardly projecting positions upwardly and outwardly to positions wherein they will clear the collars on the pipe as the device is moved downwardly around the pipe, said dogs being adapted to engage shoulders on the pipe when the device is moved upwardly, thereby holding the blocks stationary while upward movement of the cylindric wall carries said blades upwardly with relation to said blocks, whereby the blades will be swung inwardly against the pipe to be cut; and releasable means cooperating between the blocks and the cylindric wall to restrain them from relative movement while the device is being lowered.

2. In an outside pipe cutting device adapted to be lowered around a pipe having downwardly faced shoulders or collars, the combination of: a cylindric wall having a plurality of chambers open to the interior of the cylindric wall and having an annular recess therein communicating with said chambers; a cutter blade hinged in the lower part of each of said chambers so as to be swingable inwardly to engage a pipe; a cutter feed block supported in the upper part of each of said chambers so as to be moved up and down with relation to the cutter blade in the chamber, said feed blocks and said blades having cooperating faces whereby downward movement of said blocks will produce inward movement of the cutter blades to cut the pipe; an annular member vertically slidable in said recess and connecting said blocks together so that they will move in unison; pipe engaging dogs respectively supported by said blocks so as to move from inwardly projecting positions upwardly and outwardly to positions wherein they will clear the collars on the pipe as the device is moved downwardly around the pipe, said dogs being adapted to engage shoulders on the pipe when the device is moved upwardly, thereby holding the blocks stationary while upward movement of the cylindric wall carries said blades upwardly with relation to said blocks, whereby the blades will be swung inwardly against the pipe to be cut; and releasable means cooperating between the blocks and the cylindric wall to restrain them from relative movement while the device is being lowered.

3. In an outside pipe cutting device adapted to be lowered around a pipe having downwardly faced shoulders or collars, the combination of: a cylindric wall having a plurality of chambers open to the interior of the cylindric wall; a cutter blade hinged in the lower part of each of said chambers so as to be swingable inwardly to engage a pipe; a cutter feed block supported in the upper part of each of said chambers so as to be moved up and down with relation to the cutter blade in the chamber, each of said blocks having a recess therein and said feed blocks and said blades having cooperating faces whereby downward movement of said blocks will produce inward movement of the cutter blades to cut the pipe; an annular member connecting said blocks together so that they will move in unison; pipe engaging dogs respectively hinged in said recesses of said blocks so as to be swingable from inwardly projecting pipe engaging positions upwardly and outwardly to retracted positions in the recesses of said blocks wherein they will clear the collars on the pipe as the device is moved downwardly around the pipe, said dogs being adapted to engage shoulders on the pipe when the device is moved upwardly, thereby holding the blocks stationary while upward movement of the cylindric wall carries said blades upwardly with relation to said blocks, whereby the blades will be swung inwardly against the pipe to be cut; springs urging said dogs into said inwardly projecting positions; and releasable means cooperating between the blocks and the cylindric wall to restrain them from relative movement while the device is being lowered.

4. In an outside pipe cutting device adapted to be lowered around a pipe having downwardly faced shoulders or collars, the combination of: a cylindric wall having a plurality of chambers open to the interior of the cylindric wall and having an annular recess therein communicating with said chambers; a cutter blade hinged in the lower part of each of said chambers so as to be swingable inwardly to engage a pipe; a cutter feed block supported in the upper part of each of said chambers so as to be moved up and down with relation to the cutter blade in the chamber, each of said blocks having a recess therein and said feed blocks and said blades having cooperating faces whereby downward movement of said blocks will produce inward movement of the cutter blades to cut the pipe; an annular member vertically slidable in said recess and connecting said blocks together so that they will move in unison; pipe engaging dogs respectively hinged in said recesses of said blocks so as to be swingable from inwardly projecting pipe engaging positions upwardly and outwardly to retracted positions in the recesses of said blocks wherein they will clear the collars on the pipe as the device is moved downwardly around the pipe, said dogs being adapted to engage shoulders on the pipe when the device is moved upwardly, thereby holding the blocks stationary while upward movement of the cylindric wall carries said blades upwardly with relation to said blocks, whereby the blades will be swung inwardly against the pipe to be cut; springs urging said dogs into said inwardly projecting positions; and releasable means cooperating between the blocks and the cylindric wall to restrain them from relative movement while the device is being lowered.

5. In an outside pipe cutting device adapted to be lowered around a pipe having downwardly faced shoulders or collars, the combination of: a cylindric wall having a plurality of vertically elongated windows therein and having an annular recess communicating with the upper portions of the windows, at least the lower portions of the side walls of said windows being undercut; cutters hinged respectively in the lower portions of said windows so as to be swingable inwardly from positions within said windows to pipe cutting positions; cutter feed blocks vertically slidable in said windows, at least the lower portions of said blocks having lateral extensions to engage the undercut portions of the side walls of said windows, thereby preventing radially outward movement of said blocks relatively to the cylindric wall, said blocks and said blades having cooperating faces whereby downward movement of said blocks in said windows will swing said cutter blades inwardly against the pipe; pipe engaging dogs respectively supported by said blocks so as to move from inwardly projecting pipe engaging positions upwardly and outwardly into positions wherein they will clear collars on the pipe as the device is lowered around the pipe, said dogs being adapted to engage the pipe when said device is moved upwardly and hold said blocks stationary while upward movement of said cylindric wall carries said blades upwardly with relation to the blocks; an annular wall in said recess of said cylindric wall, connecting the upper portions of said blocks; and releasable means operative between the blocks and the cylindric wall to hold the blocks in fixed relation to said cylindric wall during downward movement of the device.

6. In an outside pipe cutting device adapted to be lowered around a pipe having downwardly faced shoulders or collars, the combination of: a cylindric wall having a plurality of vertically elongated windows therein and having an annular recess in the internal face thereof communicating with the upper portions of the windows, at least the lower portions of the side walls of said windows being undercut; cutters hinged respectively in the lower portions of said windows so as to be swingable inwardly from positions within said windows to pipe cutting positions; cutter feed blocks vertically slidable in said windows, at least the lower portions of said blocks having lateral extensions to engage the undercut portions of the side walls of said windows, thereby preventing radially outward movement of said blocks relatively to the cylindric wall, said blocks and said blades having cooperating faces whereby downward movement of said blocks in said windows will swing said cutter blades inwardly against the pipe; pipe engaging dogs respectively supported by said blocks so as to move from inwardly projecting pipe engaging positions upwardly and outwardly into positions wherein they will clear collars on the pipe as the device is lowered around the pipe, said dogs being adapted to engage the pipe when said device is moved upwardly and hold said blocks stationary while upward movement of said cylindric wall carries said blades upwardly with relation to the blocks; an annular wall disposed and vertically slidable in said recess of said cylindric wall, connecting the upper portions of said blocks; and releasable means operative between the blocks and the cylindric wall to hold the blocks in fixed relation to said cylindric wall during downward movement of the device.

7. In an outside pipe cutting device adapted to be lowered around a pipe having downwardly faced shoulders or collars, the combination of: a cylindric wall having a plurality of vertically elongated windows therein and having an annular recess communicating with the upper portions of the windows, at least the lower portions of the side walls of said windows being undercut; cutters hinged respectively in the lower portions of said windows so as to be swingable inwardly from positions within said windows to pipe cutting positions; cutter feed blocks vertically slidable in said windows, at least the lower portions of said blocks having lateral extensions to engage the undercut portions of the side walls of said windows, thereby preventing radially outward movement of said blocks relatively to the cylindric wall, each of said blocks having an aperture therein and said blocks and said blades having cooperating faces whereby downward movement of said blocks in said windows will swing said cutter blades inwardly against the pipe; pipe engaging dogs respectively hinged in said apertures of said blocks so as to be swingable from inwardly projecting pipe engaging positions upwardly and outwardly into said apertures wherein they will clear collars on the pipe as the device is lowered around the pipe, said dogs being adapted to engage the pipe when said device is moved upwardly and hold said blocks stationary while upward movement of said cylindric wall carries said blades upwardly with relation to the blocks; springs urging said dogs into said inwardly projecting positions; an annular wall in said recess of said cylindric wall, connecting the upper portions of said blocks; and releasable means operative between the blocks and the cylindric wall to hold the blocks in fixed relation to said cylindric wall during downward movement of the device.

8. In an outside pipe cutting device adapted to be lowered around a pipe having downwardly faced shoulders or collars, the combination of: a cylindric wall having a plurality of vertically elongated windows therein and having an annular recess in the internal face thereof communicating with the upper portions of the windows, at least the lower portions of the side walls of said windows being undercut; cutters hinged respectively in the lower portions of said windows so as to be swingable inwardly from positions within said windows to pipe cutting positions; cutter feed blocks vertically slidable in said windows, at least the lower portions of said blocks having lateral extensions to engage the undercut portions of the side walls of said windows, thereby preventing radially outward movement of said blocks relatively to the cylindric wall, each of said blocks having an aperture therein and said blocks and said blades having cooperating faces whereby downward movement of said blocks in said windows will swing said cutter blades inwardly against the pipe; pipe engaging dogs respectively hinged in said apertures of said blocks so as to be swingable from inwardly projecting pipe engaging positions upwardly and outwardly into said apertures wherein they will clear collars on the pipe as the device is lowered around the pipe, said dogs being adapted to engage the pipe when said device is moved upwardly and hold said blocks stationary while upward movement of said cylindric wall carries said blades upwardly with relation to the blocks; springs urging said dogs into said inwardly projecting positions; an annular wall disposed and vertically slidable in said recess of said cylindric wall, connecting the upper portions of said blocks; and releasable means operative between the blocks and the cylindric wall to hold the blocks in fixed relation to said cylindric wall during downward movement of the device.

WELDON C. ERWIN.

No references cited.